United States Patent
Ishihara

(10) Patent No.: US 9,663,221 B2
(45) Date of Patent: May 30, 2017

(54) ACTUATOR DEVICE FOR FLIGHT CONTROL SURFACE, FLIGHT CONTROL SURFACE OF AIRCRAFT, AND AIRCRAFT

(71) Applicant: MITSUBISHI AIRCRAFT CORPORATION, Aichi (JP)

(72) Inventor: Kenya Ishihara, Aichi (JP)

(73) Assignee: MITSUBISHI AIRCRAFT CORPORATION, Aichi (JP)

(*) Notice: Subject to any disclaimer, the term of this patent is extended or adjusted under 35 U.S.C. 154(b) by 302 days.

(21) Appl. No.: 14/105,763

(22) Filed: Dec. 13, 2013

(65) Prior Publication Data
US 2014/0175216 A1    Jun. 26, 2014

(30) Foreign Application Priority Data
Dec. 26, 2012  (JP) .................................. 2012-282530

(51) Int. Cl.
*B64C 13/36* (2006.01)
*B64C 9/02* (2006.01)
*B64C 9/00* (2006.01)

(52) U.S. Cl.
CPC ................ *B64C 13/36* (2013.01); *B64C 9/02* (2013.01); *B64C 2009/005* (2013.01)

(58) Field of Classification Search
CPC ......... B64C 13/42; B64C 13/28; B64C 13/12; B64C 9/02; B64C 9/16; B64C 9/20; B64C 25/18; B64C 3/50
See application file for complete search history.

(56) References Cited

U.S. PATENT DOCUMENTS

| | | | | |
|---|---|---|---|---|
| 3,593,620 A | * | 7/1971 | Foerster | B64C 13/42 91/510 |
| 4,470,569 A | * | 9/1984 | Shaffer | B64C 9/22 244/213 |
| 4,892,274 A | * | 1/1990 | Pohl | B64C 13/26 244/213 |

(Continued)

FOREIGN PATENT DOCUMENTS

| | | | |
|---|---|---|---|
| ES | EP 1677011 A1 * | 7/2006 | ............. B64C 13/42 |
| JP | H05-097095 A | 4/1993 | |
| JP | 2012-116466 A | 6/2012 | |

OTHER PUBLICATIONS

Japanese Office action for application No. 2012-282530 dated Feb. 1, 2017.

*Primary Examiner* — Benjamin P Lee
(74) *Attorney, Agent, or Firm* — Pearne & Gordon LLP

(57) ABSTRACT

To provide an actuator device for a flight control surface which can reduce a stress applied to the flight control surface when one of two actuators is operated. The present invention relates to a hydraulically-operated actuator device 30 which drives a flight control surface of an aircraft 1, including a first actuator 31A that is provided with a first piston rod 39A, and drives an aileron body 11; a second actuator 31B that is provided with a second piston rod 39B, and drives the aileron body 11 when the function of the first actuator 31A is lost or reduced; and a single second connection fitting 41 to which the first piston rod 39A and the second piston rod 39B are both connected, wherein the first actuator 31A and the second actuator 31B are connected to the aileron body 11 via the second connection fitting 41.

14 Claims, 7 Drawing Sheets

(56) References Cited

U.S. PATENT DOCUMENTS

| | | | | |
|---|---|---|---|---|
| 5,344,103 A | * | 9/1994 | Fitzgibbon | B64C 9/02 244/213 |
| 5,701,801 A | * | 12/1997 | Boehringer | F15B 20/00 92/166 |
| 5,806,805 A | * | 9/1998 | Elbert | B64C 13/42 244/195 |
| 6,241,182 B1 | * | 6/2001 | Durandeau | B64C 13/42 244/227 |
| 6,446,432 B1 | * | 9/2002 | Flavell | F15B 18/00 60/405 |
| 6,755,375 B2 | * | 6/2004 | Trikha | B64C 13/42 244/213 |
| 6,776,376 B2 | * | 8/2004 | Collins | B64C 13/30 244/213 |
| 6,827,311 B2 | * | 12/2004 | Wingett | B64C 13/50 244/227 |
| 7,048,234 B2 | * | 5/2006 | Recksiek | B64C 13/503 244/213 |
| 7,059,563 B2 | * | 6/2006 | Huynh | B64C 9/16 244/226 |
| 7,607,611 B2 | * | 10/2009 | Wingett | B64C 13/42 244/224 |
| 7,766,282 B2 | * | 8/2010 | Kordel | B64C 9/02 244/201 |
| 8,276,842 B2 | * | 10/2012 | Kracke | B64C 13/28 244/99.2 |
| 8,517,315 B2 | * | 8/2013 | Andreani | B64C 9/16 244/215 |
| 8,757,544 B2 | * | 6/2014 | Ito | B64C 13/36 244/99.3 |
| 2004/0200928 A1 | * | 10/2004 | Degenholtz | B64C 13/50 244/99.2 |
| 2006/0243864 A1 | | 11/2006 | Ambrose | |
| 2007/0194738 A1 | * | 8/2007 | Hirai | B64C 13/42 318/480 |
| 2009/0206197 A1 | * | 8/2009 | Degenholtz | B64C 13/24 244/99.3 |
| 2010/0108845 A1 | * | 5/2010 | Martin Hernandez | B64C 13/28 248/300 |
| 2011/0001015 A1 | * | 1/2011 | Kracke | B64C 13/28 244/213 |
| 2011/0220761 A1 | * | 9/2011 | Ogawa | B64C 13/24 244/99.3 |
| 2012/0131912 A1 | | 5/2012 | Fukui et al. | |
| 2013/0181089 A1 | * | 7/2013 | Recksiek | B64C 9/16 244/99.3 |

\* cited by examiner

ACTUATOR DEVICE FOR FLIGHT CONTROL SURFACE, FLIGHT CONTROL SURFACE OF AIRCRAFT, AND AIRCRAFT

BACKGROUND OF THE INVENTION

Field of the Invention

The present invention relates to an actuator device which drives a flight control surface of an aircraft.

Description of the Related Art

In aircrafts, a hydraulically-operated actuator is generally used for driving an aileron, an elevator, and a rudder that constitute a control surface. The hydraulic actuator supplies hydraulic oil from a hydraulic source provided on an aircraft fuselage side to thereby drive the flight control surface such as the aileron. To ensure reliability for the aircrafts, a hydraulic system which uses at least two actuators, and supplies hydraulic oil to the respective actuators from flow paths of separate systems has been proposed (e.g., Japanese Patent Laid-Open No. 2012-116466). In the hydraulic system, even when the function of one of the systems including the actuators is lost or reduced, the system is switched to the other system so as to drive the flight control surface.

As shown in FIG. 6B, in a case in which the hydraulic system includes two actuators (a first actuator 131A and a second actuator 131B), the first actuator 131A and the second actuator 131B are suspended between a main wing 2 and an aileron body 11. In the first actuator 131A, a piston rod 132A is connected to the aileron body 11 via a connection fitting 141A. In the second actuator 131B, a piston rod 132B is connected to the aileron body 11 via a connection fitting 141B.

During normal cruising, the first actuator 131A is used to drive the flight control surface (e.g., the aileron body 11). At this point, the second actuator 131B stands by so as to ensure redundancy. The second actuator 131B acts as a damper for the operation of the first actuator 131A during standing by. For example, as shown in FIG. 6B, when the piston rod 132A of the first actuator 131A is extended, a pushing force P acts on the aileron body 11, and a tensile force T acts on a portion to which the second actuator 131B is connected. Accordingly, a shear stress or a torsional stress is generated between the connection fitting 141A of the first actuator 131A and the connection fitting 141B of the second actuator 131B in the aileron body 11. When the stress S is repeatedly applied, fatigue of the portion of the aileron body 11 is accelerated.

It is thus an object of the present invention to provide an actuator device which drives a flight control surface, and can reduce a stress generated on the flight control surface when one actuator out of at least two actuators is operated.

SUMMARY OF THE INVENTION

To achieve the above object, the present invention is an actuator device which drives a flight control surface of an aircraft, the actuator device comprising: a first actuator that comprises a first output section, and drives the flight control surface; a second actuator that comprises a second output section, and drives the flight control surface instead of the first actuator; and a connection fitting to which the first output section and the second output section are both connected, wherein the first actuator and the second actuator are connected to the flight control surface via the connection fitting.

In the actuator device for a flight control surface according to the present invention, since the two actuators of the first actuator and the second actuator are connected to the common connection fitting, exchange of a force between the first actuator and the second actuator is performed via the connection fitting when the first actuator is operated. Therefore, a stress due to the operation of the first actuator is not applied to the flight control surface, or even when applied, the stress can be sufficiently reduced.

The actuator device may further comprise: a first link member (43), one end of which is rotatably supported on the first actuator and another end of which is rotatably supported on the connection fitting; and a second link member (43), one end of which is rotatably supported on the second actuator and another end of which is rotatably supported on the connection fitting, wherein in the first actuator, the first output section is rotatably connected to the connection fitting at a position apart from a position where the first link member is supported, and in the second actuator, the second output section is rotatably connected to the connection fitting at a position apart from a position where the second link member is supported. In accordance with the configuration, the first actuator and the second actuator, when driven, form a slider clank mechanism that rotates the connection fitting in a swinging manner. The mechanism can exchange a force generated by operating the first actuator and the second actuator within the mechanism.

The actuator device according to the present invention is effective when hydraulic oil is supplied to the first actuator and the second actuator from separate hydraulic systems.

When the function of one (e.g., the first actuator) of the first actuator and the second actuator is lost, the flight control surface is driven by the second actuator. If the first actuator cannot be operated at all, the first actuator acts as extremely strong resistance against the operation of the second actuator. In this case, a large force is exchanged between the first actuator and the second actuator. If the force is exchanged via the flight control surface, fatigue of the flight control surface is significantly accelerated, possibly leading to damage to the flight control surface. However, when the common connection fitting is used, the damage to the flight control surface can be avoided.

In the actuator device for a flight control surface according to the present invention, the two actuators are connected to the flight control surface via the common connection fitting. Thus, when one of the actuators is operated, the exchange of the force with the other actuator is performed within a range through the connection fitting. Consequently, the stress due to the operation of the actuator is not applied to the flight control surface, or even when applied, the stress can be reduced to a negligible level.

DETAILED DESCRIPTION OF THE PREFERRED EMBODIMENTS

In the following, the present invention is described in detail based on an embodiment shown in the accompanying drawings.

Figure 1:
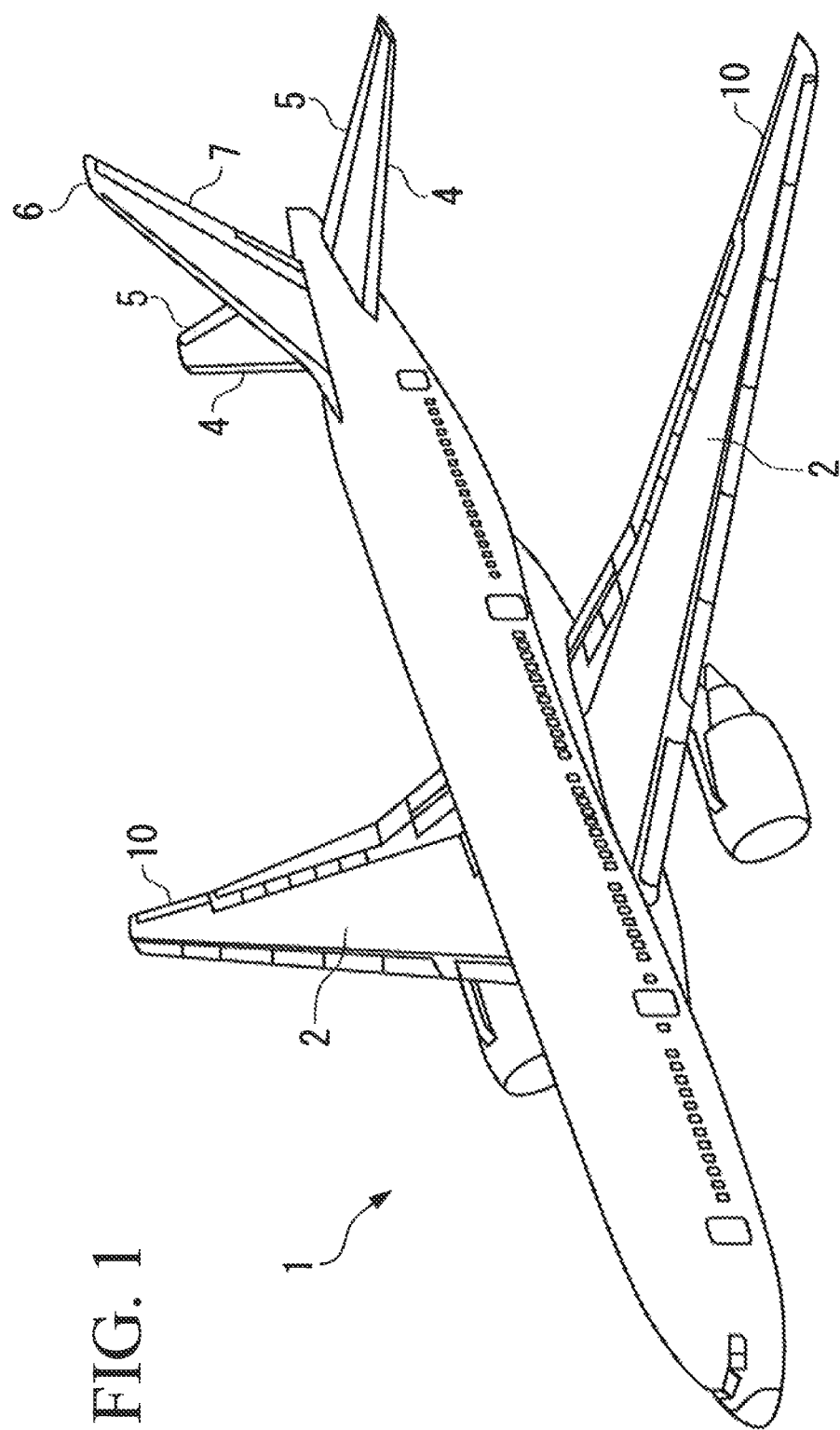
FIG. 1 is a perspective view illustrating an aircraft.

The present embodiment is described based on an example in which an actuator device according to the present invention is applied to an aileron 10 provided at a main wing 2 of an aircraft 1 shown in FIG. 1. However, a portion to which the present invention is applied is not limited to the aileron 10, and the present invention may be also applied to another flight control surface such as an elevator 5 provided at a horizontal tail 4 and a rudder 7 provided at a vertical tail 6.

Figure 2:
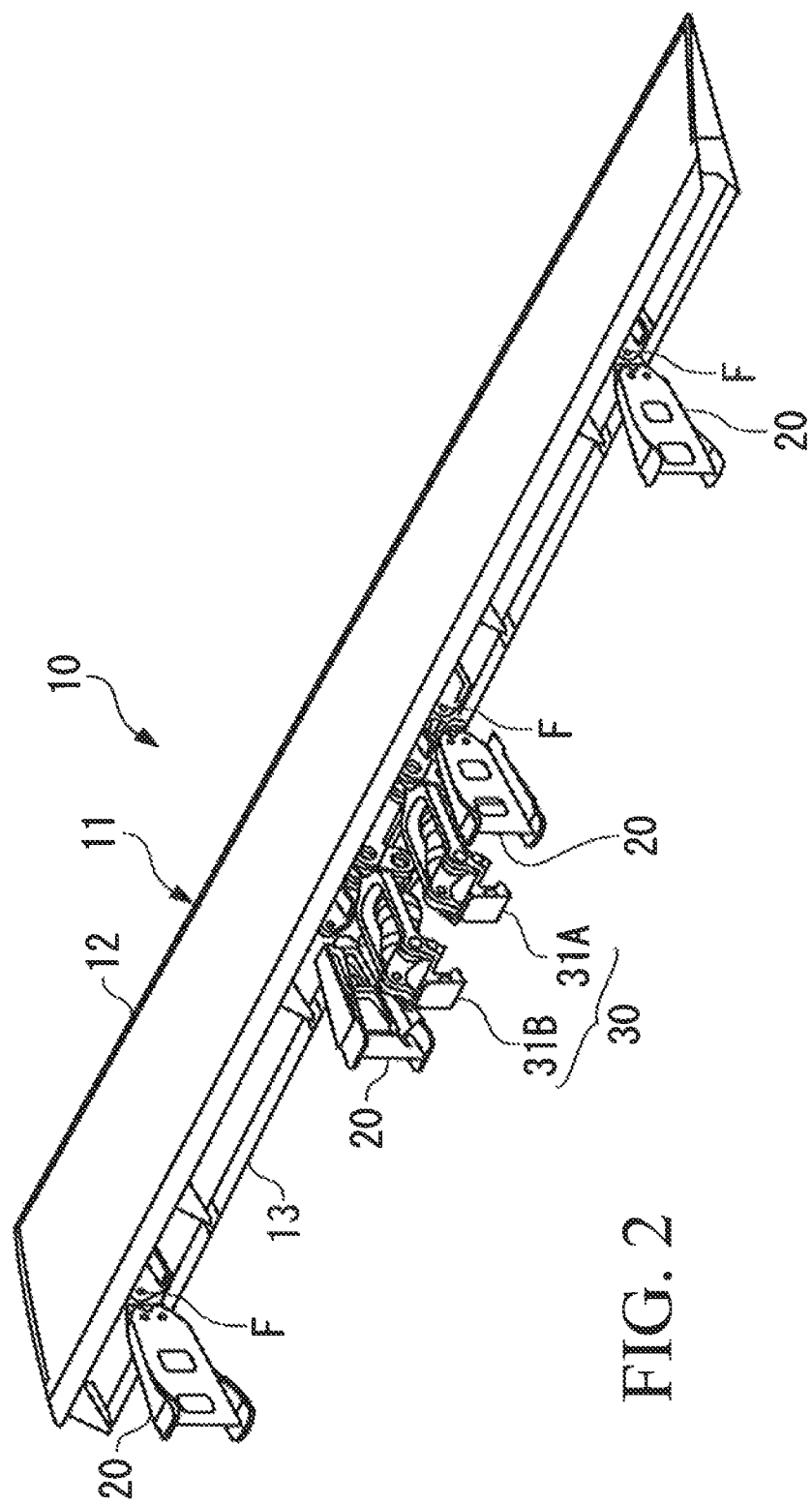
FIG. 2 is a perspective view illustrating an aileron according to a present embodiment.
Figure 3:
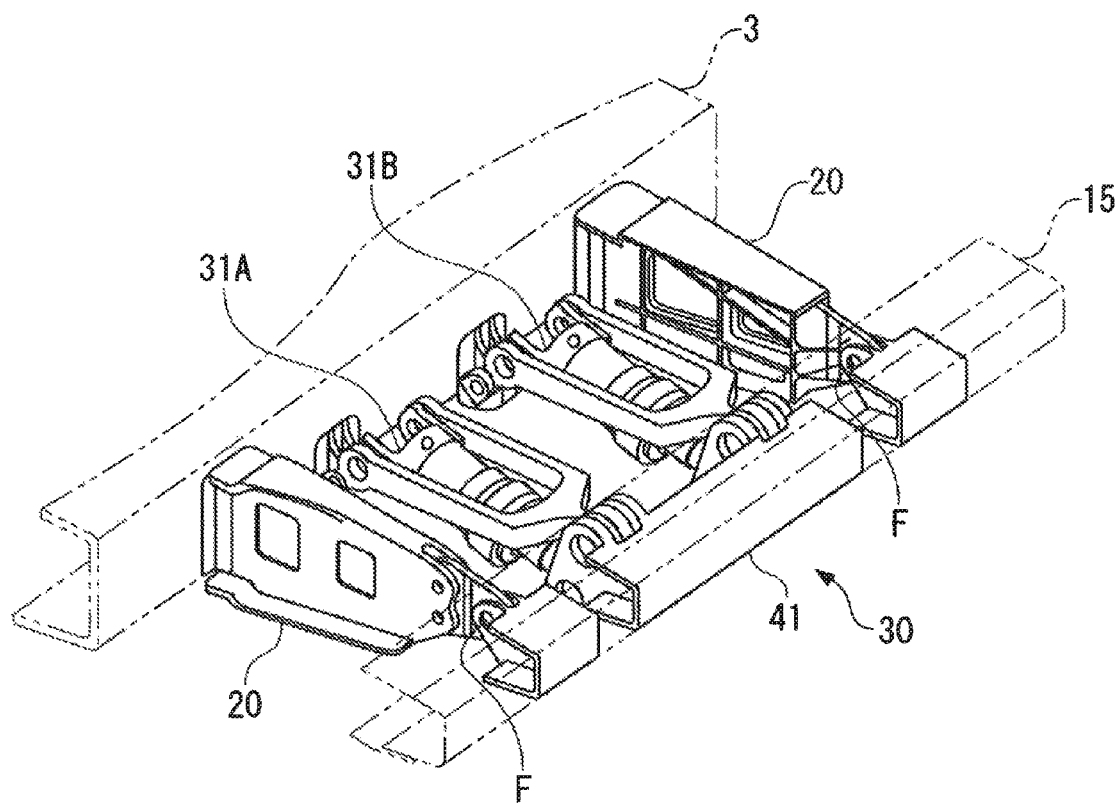
FIG. 3 is an enlarged perspective view illustrating a portion around an actuator of the aileron according to the present embodiment.

As shown in FIGS. 2 and 3, the aileron 10 includes an aileron body 11 that functions as a control surface, hinges 20 that support the aileron body 11 so as to move the aileron body 11 up and down relative to the main wing 2, and an actuator device 30 that drives the aileron body 11. The aileron 10 is connected to a rear spar 3 of the main wing 2 at four positions by the hinges 20. The aileron 10 thereby rotates clockwise and counterclockwise about a rotational axis of the control surface or fulcrum F of the hinges 20 within a predetermined movable angle range so as to allow the aircraft 1 to roll.

An outer skin of the aileron body 11 is composed of an upper skin 12 and a lower skin 13 made of, for example, CFRP (carbon fiber reinforced plastic). The hinges 20 and the actuator device 30 are arranged on an opening side facing the main wing 2.

One end of each of the hinges 20 is connected to the rear spar 3 of the main wing 2, and the other end thereof is connected to the aileron body 11 side. The four hinges 20 are provided at predetermined intervals in a longitudinal direction of the aileron body 11. The actuator device 30 is provided between the two hinges 20 provided in the center. The aileron body 11 rotates within a movable angle range about the rotational axis of the control surface or fulcrum F of each of the hinges 20 following the operation of the actuator device 30. In FIGS. 2 and 3, a fastener for fixing the hinges 20 or the actuator device 30 to the aileron body 11 or the like is omitted. The same applies to FIG. 4 described below.

The actuator device 30 includes two drive sources of a first actuator 31A and a second actuator 31B. Hydraulic actuators (hydraulic cylinders) having the same specifications are employed as the first actuator 31A and the second actuator 31B so as to drive the aileron 10 on the same conditions by using any one of the actuators.

Figure 7:
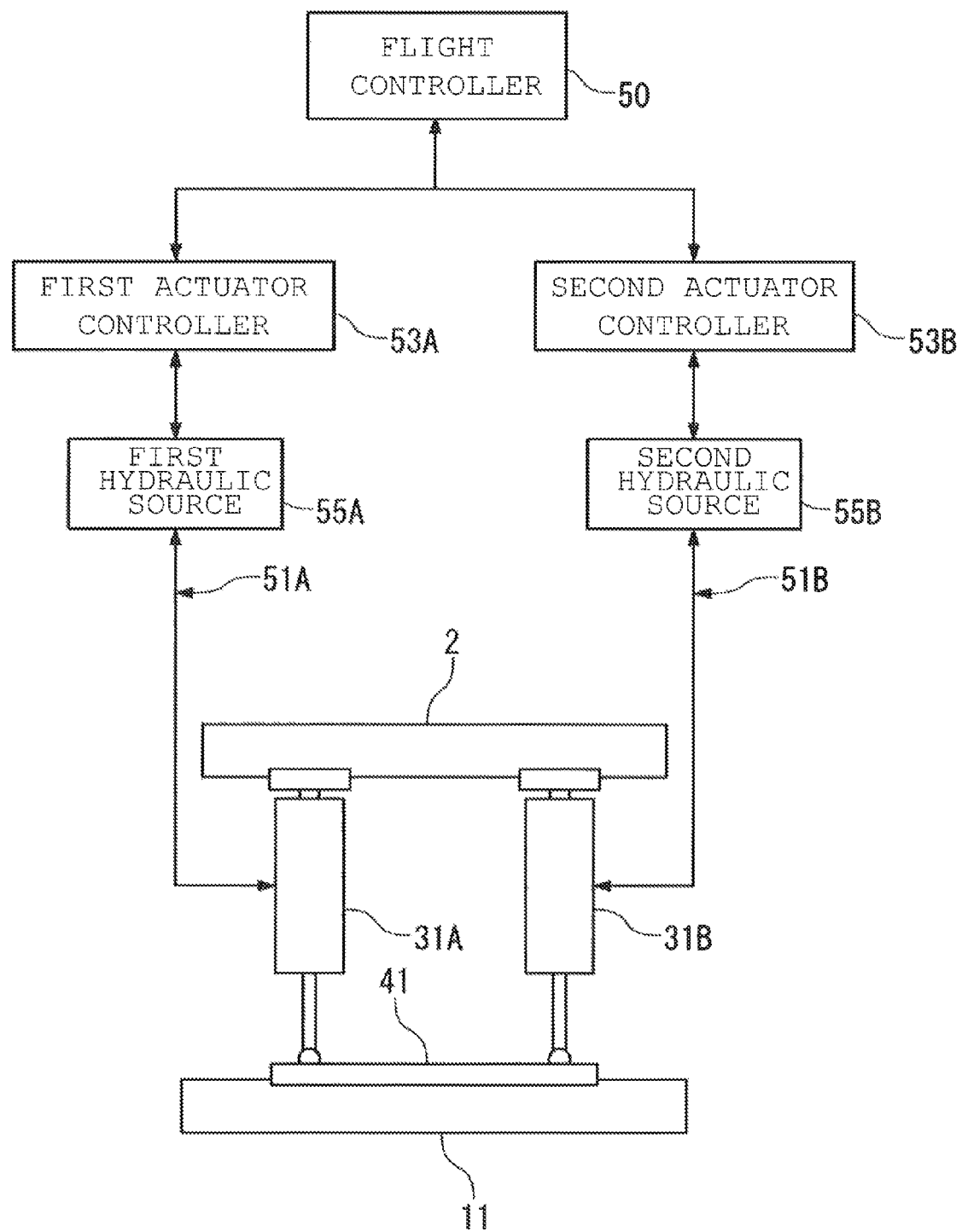
FIG. 7 is a view illustrating the schematic configuration of a hydraulic system that supplies hydraulic oil to the actuator device according to the present embodiment.

As shown in FIG. 7, hydraulic oil is supplied to the first actuator 31A and the second actuator 31B from a first hydraulic system 51A and a second hydraulic system 51B which are independent and separate from each other. That is, the first actuator 31A operates with pressure oil from a first hydraulic source 55A that belongs to the first hydraulic system 51A, and the second actuator 31B operates with pressure oil from a second hydraulic source 55B that belongs to the second hydraulic system 51B. A flight controller 50 is provided in the aircraft 1. The flight controller 50 functions as control means superior to a first actuator controller 53A and a second actuator controller 53B, and configured to command the operation of the aileron body 11 via the first actuator controller 53A and the second actuator controller 53B. The flight controller 50 generates a command signal that commands the operation of the aileron body 11 based on a manipulation/instruction of a pilot, and transmits the command signal to the two actuator controllers 53A and 53B. Then, the actuator controllers 53A and 53B respectively control the operation of the first actuator 31A and the second actuator 31B based on the command signal.

During normal cruising, it is instructed to drive the aileron body 11 by using the first actuator 31A out of the actuators. At this point, the other second actuator 31B stands by so as to ensure redundancy, and does not actively drive the aileron body 11. The first actuator controller 53A and the second actuator controller 53B respectively detect whether or not the first hydraulic source 55A and the second hydraulic source 55B operate normally by acquiring the pressure of the hydraulic oil or the like. For example, when determining that the function of the first hydraulic source 55A is lost or reduced, the first actuator controller 53A transmits a signal indicative of the loss or reduction of the function to the flight controller 50. The flight controller 50 thereby transmits a command signal to the second actuator controller 53B so as to cause the second actuator 31B to drive the aileron body 11 instead of the first actuator 31A. The second actuator 31B drives the aileron body 11 based on the instruction from the second actuator controller 53B.

Figure 4:
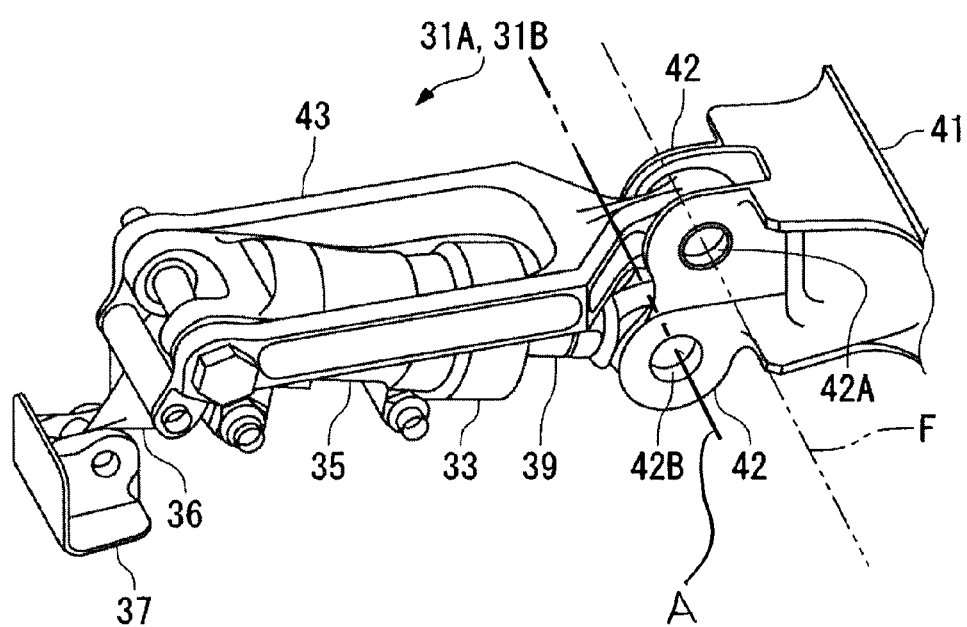
FIG. 4 is a perspective view illustrating the actuator according to the present embodiment.

As shown in FIG. 4, each of the first actuator 31A and the second actuator 31B includes a hydraulic cylinder 33 as a main constituent element. The hydraulic cylinders 33 respectively include cylinder bodies 35, and piston rods (a first output section and a second output section) 39 and 39 connected to pistons (not shown). The inside of each of the cylinder bodies 35 is sectioned into two oil chambers by the piston. In each of the hydraulic cylinders 33, a rear end portion of the cylinder body 35 is rotatably fixed to the rear spar 3 of the main wing 2 via a first link 36 and a first connection fitting 37, and the piston rod 39 is rotatably supported about an axis A on an aileron spar 15 (the aileron body 11) via a second connection fitting 41.

Each of the first actuator 31A and the second actuator 31B includes a second link 43. Each of the second links 43 is provided between the rear end portion of the cylinder body 35 and the second connection fitting 41. The second link 43 has a Y shape. A distal end on the bifurcated side is rotatably supported on the rear end portion of the cylinder body 35, and a distal end on the other side is rotatably supported on the second connection fitting 41 about the rotational axis or fulcrum F. The support position is located above the support position of the piston rod 39.

Therefore, the first actuator 31A and the second actuator 31B form a slider clank mechanism that rotates the aileron body 11 in a swinging manner about the fulcrum F of each of the hinges 20 by driving the hydraulic cylinders 33. Since the mechanism includes the second links 43, a force generated by the operation of the hydraulic cylinders 33 can be exchanged within the mechanism.

In the following, a side closer to the main wing 2 in the actuator device 30 is defined as "rear side", and a side closer to the aileron body 11 is defined as "front side".

Since the first actuator 31A and the second actuator 31B are mounted between the main wing 2 and the aileron body 11 as described above, the aileron body 11 is rotated and driven in a predetermined direction when the piston rod 39 of the actuator is extended. The aileron body 11 is rotated and driven in an opposite direction when the piston rod 39 is compressed.

In the actuator device 30, the two actuators of the first actuator 31A and the second actuator 31B are connected to the aileron body 11 via the single common second connection fitting 41. This point is one of the features of the present embodiment.

Figure 5:
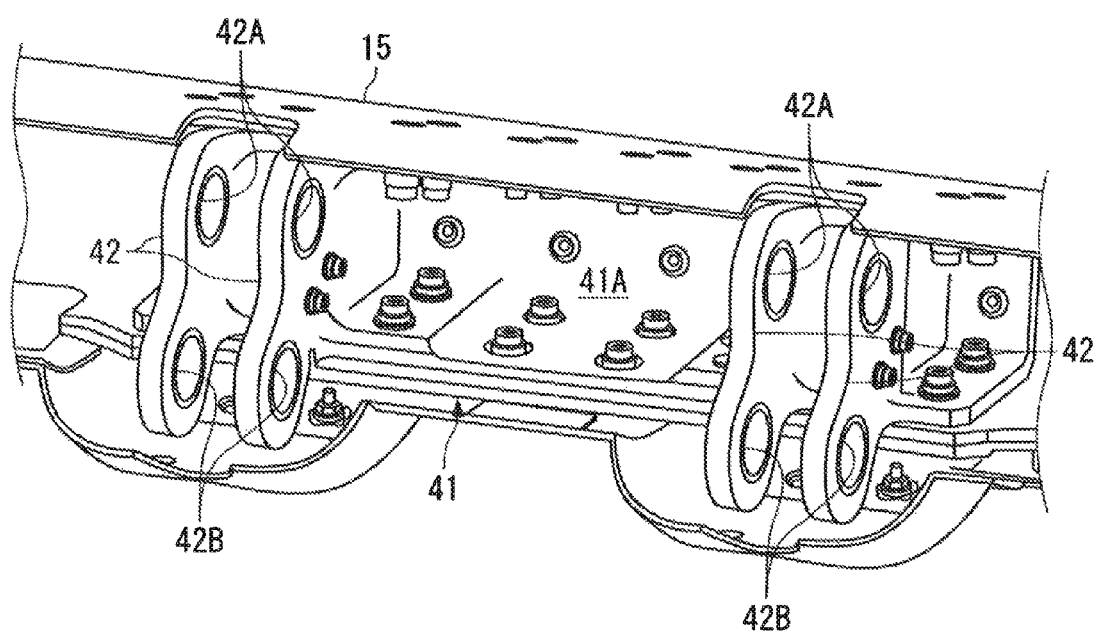
FIG. 5 is a view illustrating an actuator connection fitting mounted to the aileron according to the present embodiment.

As shown in FIGS. 3 to 5, the second connection fitting 41 has a substantially C-shaped section, and paired two support pieces 42 are provided at each of both ends of a concave portion 41A. Support holes 42A and 42B for supporting the hydraulic cylinder 33 (the piston rod 39) and the second link 43 are formed in each of the support pieces 42. The second link 43 is supported on the second connection fitting 41 via the support pieces 42 by passing a fastening member such as a bolt through a support hole (not shown) formed in a front end of the second link 43 and the support holes 42A in the support pieces 42. The piston rod 39 (the hydraulic cylinder 33) of each of the first actuator 31A and the second actuator 31B is supported on the second connection fitting 41 via the support pieces 42 by passing a fastening member such as a bolt through a support hole (not shown) formed in a front end of the piston rod 39 and the support holes 42B in the support pieces 42.

As described above, the front end sides of the first actuator 31A and the second actuator 31B are connected to the single common second connection fitting 41.

In the aileron 10 having the aforementioned configuration, when a pilot instructs the operation (extension or compression of the piston rod 39) to the first actuator 31A of the actuator device 30 via the flight controller 50, the aileron body 11 is driven according to the instruction to cause the aircraft 1 to roll. The actuator device 30 provides effects as described below.

Figure 6A:
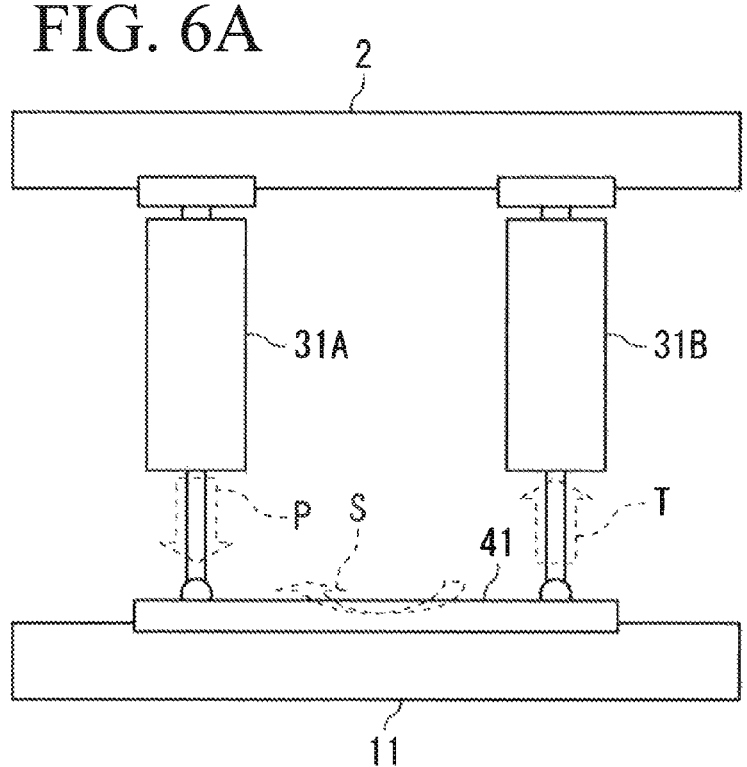
FIG. 6A is a view for explaining exchange of a force between two actuators in the aileron according to the present embodiment.

In the normal cruising in which the aileron body 11 is driven by using the first actuator 31A, the first actuator 31A applies a pushing force P (or a tensile force T) to the second connection fitting 41 as shown in FIG. 6A. At this point, the second actuator 31B acts in a direction to attenuate the force generated by the first actuator 31A, so that a tensile force T (or a pushing force P) is applied to the second connection fitting 41. A stress S from the exchange of the force between the first actuator 31A and the second actuator 31B is generated on the second connection fitting 41 to which the front ends of both the first actuator 31A and the second actuator 31B are connected. That is, the exchange of the force between the first actuator 31A and the second actuator 31B can be prevented from acting on the aileron body 11 including the aileron spar 15, or the action thereof can be reduced by using the single common second connection fitting 41.

The rigidity of the second connection fitting 41 is considered such that the exchange of the force between the first actuator 31A and the second actuator 31B does not largely affect the aileron spar 15 (the aileron body 11).

Figure 6B:
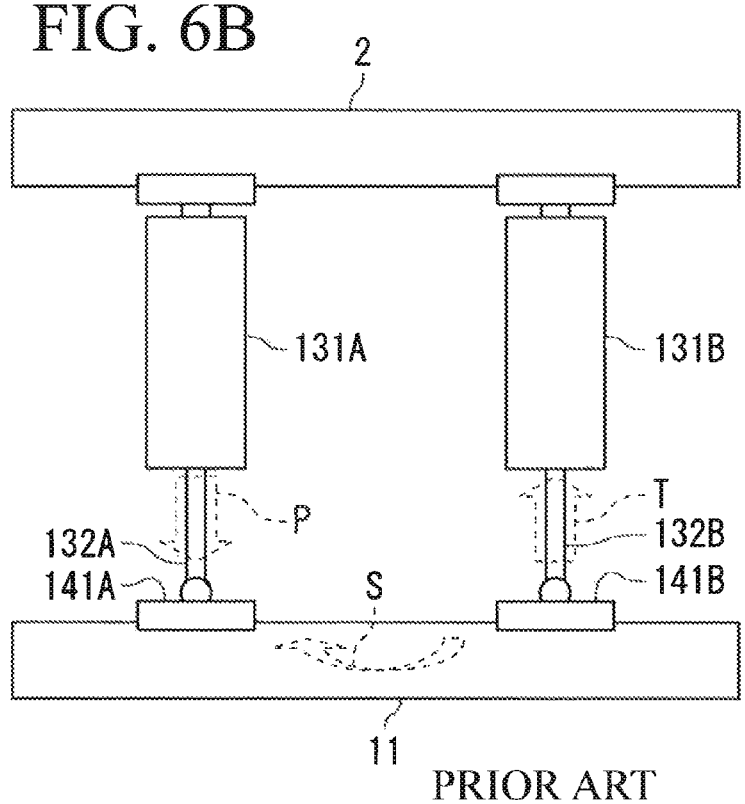
FIG. 6B is a view for explaining exchange of a force between two actuators in a conventional aileron.

In conventional cases, a first actuator 131A and a second actuator 131B are connected to the aileron body 11 via connection fittings 141A and 141B independent of each other, and the stress S from the exchange of the force between the first actuator 131A and the second actuator 131B is generated on the aileron body 11 as shown in FIG. 6B. That is, the pushing force P (or the tensile force T) by the first actuator 131A, and the tensile force T (or the pushing force P) acting against the force are applied to the aileron body 11, and the stress S such as a shear stress is applied to the aileron body 11 between the first actuator 131A and the second actuator 131B.

Meanwhile, in the actuator device 30 according to the present embodiment, the exchange of the force between the first actuator 31A and the second actuator 31B can be performed via the second connection fitting 41 as described above. Accordingly, direct application of the stress such as a shear stress that accelerates fatigue to the aileron body 11 can be reduced.

The above effect is particularly effective when the first actuator 31A cannot be operated at all. In this case, the first actuator 31A acts as extremely strong resistance against the operation of the second actuator 31B. The exchange of the force between the first actuator 31A and the second actuator 31B is thereby significantly increased. When the exchange of the force between the first actuator 31A and the second actuator 31B is performed via the aileron body 11, the fatigue of the aileron body 11 is significantly accelerated, possibly leading to damage to the aileron body 11. In the present embodiment, however, the first actuator 31A and the second actuator 31B are connected to the common connection fitting 41, so that the damage to the aileron body 11 can be avoided.

Although the above embodiment has been described by using the aileron as an example, the present invention may be also applied to another control surface such as an elevator that moves a nose of the aircraft up and down, and a rudder that changes the direction of the nose to the right and the left.

Although the example in which the second connection fitting 41 is integrally fabricated has been described, the second connection fitting 41 only needs to have rigidity large enough not to cause the exchange of the force between the first actuator 31A and the second actuator 31B to affect the aileron body 11. For example, fittings respectively connected to the first actuator 31A and the second actuator 31B may be rigidly joined together.

Moreover, the present invention is not limited to the switching between the first actuator 31A and the second actuator 31B when the function of one of the actuators is lost or reduced. The present invention also includes an actuator device which can switch the two actuators according to an intentional instruction of a pilot. Although the example in which the aileron 10 is driven by the first actuator 31A in the normal cruising has been described, it goes without saying that the driven actuator and the actuator that stands by may be replaced in each flight.

In the present invention, a material suitable for properties required for the respective constituent elements of the aileron 10 is appropriately selected for each of the constituent elements. For example, a metal material such as aluminum alloy as well as fiber reinforced plastic such as CFRP (carbon fiber reinforced plastic) and GFRP (glass fiber reinforced plastics) is preferably used for the aileron body 11. Also, aluminum alloy is preferably used for the link member and the connection fitting of the actuator device 30.

The constitutions described in the embodiment described above may be also freely selected or changed into other constitutions without departing from the gist of the present invention.

What is claimed is:
1. An actuator device for a flight control surface which drives a flight control surface of an aircraft, the actuator device comprising:
 a first actuator that comprises a first output section, and drives the flight control surface;
 a second actuator that comprises a second output section, and drives the flight control surface instead of the first actuator; and
 a connection fitting to which each of the first output section and the second output section is connected, wherein the first actuator and the second actuator are connected to the flight control surface via the connection fitting, a first link member, one end of which is rotatably supported on the first actuator and another end of which is rotatably connected to the connection fitting about a rotational axis of the control surface, and a second link member, one end of which is rotatably supported on the second actuator and another end of which is rotatably connected to the connection fitting about the rotational axis of the control surface, wherein in the first actuator, the first output section is rotatably connected to the connection fitting about an axis offset from the rotational axis of the control surface where the first link member and the second link member are rotatably connected, and in the second actuator, the second output section is rotatably connected to the connection fitting about the axis offset from the rotational axis of the control surface, wherein actuation of the first actuator or the second actuator causes the connection fitting to pivot about the rotational axis of the control surface.

2. The actuator device for a flight control surface according to claim 1,
wherein each of the first actuator and the second actuator comprises a hydraulic cylinder as a main constituent element.

3. The actuator device for a flight control surface according to claim 2,
wherein the hydraulic cylinder of the first actuator comprises a piston rod as the first output section, and the hydraulic cylinder of the second actuator comprises a piston rod as the second output section.

4. The actuator device for a flight control surface according to claim 2,
wherein each of the first link member and the second link member has a Y shape,
a distal end on a bifurcated side of each of the first link member and the second link member is rotatably supported on an end portion of the hydraulic cylinder, and a distal end on the opposite side of each of the first link member and the second link member is rotatably supported on the connection fitting.

5. The actuator device for a flight control surface according to claim 1,
wherein hydraulic oil is supplied to the first actuator and the second actuator from separate hydraulic systems.

6. The actuator device for a flight control surface according to claim 1,
wherein the flight control surface is an aileron.

7. The actuator device for a flight control surface according to claim 1,
wherein both of the first actuator and the second actuator are provided on the same flight control surface and are located in a longitudinal direction of the flight control surface.

8. The actuator device for a flight control surface according to claim 7,
wherein the first actuator and the second actuator are located near the center of the flight control surface.

9. The actuator device for a flight control surface according to claim 1,
wherein hinges are provided on the flight control surface so as to be located near the first actuator and the second actuator and in a longitudinal direction of the flight control surface.

10. A flight control surface of an aircraft which is driven by the actuator device according to claim 1.

11. An aircraft comprising a flight control surface driven by the actuator device according to claim 1.

12. The aircraft according to claim 11,
wherein the flight control surface is an aileron.

13. The actuator device for a flight control surface according to claim 1, wherein the first actuator and the second actuator are separately hinged to the connection fitting.

14. An actuator device for a flight control surface which drives a flight control surface of an aircraft, the actuator device comprising:
a first actuator that comprises a first output section, and drives the flight control surface;
a second actuator that comprises a second output section, and drives the flight control surface instead of the first actuator; and
a connection fitting to which the first output section and the second output section are both connected,
wherein the first actuator and the second actuator are connected to the flight control surface via the connection fitting,
wherein each of the first actuator and the second actuator comprises a hydraulic cylinder as a main constituent element,
wherein the hydraulic cylinder of the first actuator comprises a piston rod as the first output section, and the hydraulic cylinder of the second actuator comprises a piston rod as the second output section, and
wherein the connection fitting has a substantially C-shaped section, and comprises supporting members,
one of the supporting members supports the another end of the first link member and one end of the piston rod as the first output section,
another of the supporting members supports the another end of the second link member and one end of the piston rod as the second output section.

* * * * *